(12) United States Patent
Yoon

(10) Patent No.: US 8,424,032 B2
(45) Date of Patent: Apr. 16, 2013

(54) SPINDLE MOTOR HAVING A CHUCKING MEMBER

(75) Inventor: Hoeop Yoon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 324 days.

(21) Appl. No.: 12/858,934

(22) Filed: Aug. 18, 2010

(65) Prior Publication Data
US 2011/0047563 A1 Feb. 24, 2011

(30) Foreign Application Priority Data
Aug. 18, 2009 (KR) .................. 10-2009-0076045

(51) Int. Cl.
*G11B 17/028* (2006.01)
*G11B 19/20* (2006.01)

(52) U.S. Cl.
USPC .......................................... 720/707

(58) Field of Classification Search .............. 720/703, 720/704, 706, 707, 709
See application file for complete search history.

(56) References Cited

U.S. PATENT DOCUMENTS

| | | | |
|---|---|---|---|
| 5,501,760 A * | 3/1996 | Mukawa .................. | 156/305 |
| 5,799,006 A * | 8/1998 | Mukawa .................. | 720/707 |
| 6,208,613 B1 * | 3/2001 | Iizuka ..................... | 720/707 |
| 6,363,048 B1 * | 3/2002 | Wu et al. ................ | 720/707 |
| 6,577,586 B1 * | 6/2003 | Yang et al. .............. | 720/707 |
| 6,611,490 B1 * | 8/2003 | Bierhoff ................. | 720/707 |
| 6,778,487 B2 * | 8/2004 | Morishita ............... | 369/264 |
| 7,343,610 B2 * | 3/2008 | Shibata .................. | 720/713 |
| 7,380,255 B2 * | 5/2008 | Chen ...................... | 720/703 |
| 7,849,474 B2 * | 12/2010 | Kuramoto et al. ..... | 720/707 |
| 7,992,160 B2 * | 8/2011 | Takaki et al. .......... | 720/707 |
| 8,024,751 B2 * | 9/2011 | Yoon ...................... | 720/712 |
| 8,065,693 B2 * | 11/2011 | Lee ........................ | 720/707 |
| 8,176,504 B2 * | 5/2012 | Kim et al. .............. | 720/604 |
| 2002/0176352 A1 * | 11/2002 | Konno et al. .......... | 369/271 |
| 2003/0026193 A1 * | 2/2003 | Shiomi et al. ......... | 369/270 |
| 2003/0107984 A1 * | 6/2003 | Yamaguchi ............ | 369/270 |
| 2006/0206909 A1 * | 9/2006 | Kuse et al. ............. | 720/707 |
| 2011/0055858 A1 * | 3/2011 | Yoon ...................... | 720/695 |
| 2011/0321068 A1 * | 12/2011 | Park et al. .............. | 720/704 |

FOREIGN PATENT DOCUMENTS

KR 10-2003-0010883 A 2/2003
KR 1020040001315 A * 12/2004

OTHER PUBLICATIONS

Partial English Translation of KR 10-2004-0001315; published Dec. 2004; 5 pages.*
Office Action dated Jan. 20, 2011 in Korean Application No. 10-2009-0076045, filed Aug. 18, 2009.

* cited by examiner

*Primary Examiner* — Brian Miller
(74) *Attorney, Agent, or Firm* — Saliwanchik, Lloyd & Eisenschenk

(57) ABSTRACT

A spindle motor is disclosed, wherein a spindle motor includes a rotating shaft coupling to a rotor yoke for supporting an optical disc, a clamp case disposing on the rotor yoke and coupling to the rotating shaft; and a chucking member including a rim portion combined with the clamp case, a plurality of extension portion radically extruded from an edge portion of the rim portion, and chucking arm portions formed at each of the end portion of the extension portions to chuck an inner face of the optical disc.

19 Claims, 4 Drawing Sheets

SPINDLE MOTOR HAVING A CHUCKING MEMBER

CROSS-REFERENCE TO RELATED APPLICATION

This application claims the benefit of Korean Application Number 10-2009-0076045, filed Aug. 18, 2009, which is hereby incorporated by reference in its entirety.

BACKGROUND

1. Field of the Invention

The present invention relates to a spindle motor, more particularly the present invention relates to a spindle motor including a chucking member having a chucking arm for chucking an optical disc and an elastic member integrally formed with the chucking arm.

2. Description of Related Art

In general, a spindle motor includes a stator, a rotation shaft coupled to the stator, and a rotor yoke combined with the rotation shaft so that the rotor yoke rotates with the rotation shaft.

Particularly, a slim optical disc driver, which is installed on portable electronic equipment such as a laptop computer, has an insufficient space for installing a clamper to clamp an optical disc and/or a turn table to mount the optical disc. Thus, in the slim optical disc driver, the optical disc is directly disposed on a upper face of the rotor yoke and a clamp case for clamping the optical disc is disposed over the rotor yoke coupled to the rotation shaft.

The conventional clamp case of the spindle motor includes a plurality of chucking arm for clamping the optical disc and a spring for elastically supporting the chucking arm. Since the spring is assembled with the chucking arms included the conventional clamp, parts of the spindle motor and an assembly time of the spindle motor are greatly increased.

BRIEF SUMMARY

The present disclosure is to provide a spindle motor that includes a chucking member having a chucking arm and an elastic member integrally formed with the chucking arm.

According to one aspect of the present disclosure, the object described above may be achieved by a spindle motor, comprising: a rotating shaft coupling to a rotor yoke for supporting an optical disc; a clamp case disposed on the rotor yoke and coupling to the rotating shaft; and a chucking member including a rim portion combined with the clamp case, a plurality of extension portion radically extruded from an edge portion of the rim portion, and chucking arm portions formed at each of the end portion of the extension portions to chuck an inner face of the optical disc.

According to another aspect of the present invention, the object described above may be achieved by a spindle motor, comprising: a rotating shaft coupling to a rotor yoke for supporting an optical disc; a clamp case disposing on the rotor yoke and coupling to the rotating shaft; and a chucking member having a plurality of chucking arm portion for chucking the optical disc by using an elastic force and each of the chucking members being formed at a same interval; wherein each of the chucking arm portions having a protruded plate shape protruded from an rim portion that is coupled to the claim case and each of the chucking arm portion is coupled to an inner face of the optical disc using the through-hole.

According to still another aspect of the present invention, the object described above may be achieved by a spindle motor, comprising: a stator including a bearing housing fixed to a base plate, a bearing combined within the bearing housing, a core coupled disposed around the bearing housing, and a coil wound around the core; a rotating shaft rotatably coupled to the bearing; a rotor including a yoke coupled to the rotating shaft and a magnet, which is disposed in the yoke, opposite to the core; a turn table for mounting an optical disc coupled to the rotating shaft; a clamp case disposed on the turn table and coupled to the rotating shaft; and a chucking member including a rim portion combined with the clamp case, a plurality of extension portion radically extruded from an edge portion of the rim portion, and chucking arm portion formed at each of the end portion of the extension portions to chuck an inner face of the optical disc.

DETAILED DESCRIPTION

First, terms as used throughout this specification are defined as follows.

In the present invention, an optical disc drive (ODD) is defined as a device for recoding data to a track formed at a recoding face of an optical disc such as a compact disc (CD), DVD disc, and a blue-ray (BD) disc or for reading data from the track of the recording face of the optical disc.

The optical disc drive (ODD) includes a spindle motor and an optical pick up unit. The spindle motor rotates the optical disc at a high speed. The optical pick up unit irradiates a beam such as a laser beam to the recoding face of the optical disc to record or read data to/from the recording face of the optical disc.

The optical disc drive (ODD) applied to a slim portable electronic equipment such as a laptop computer is required the spindle motor having a very thin thickness so as to avoid increase of a total thickness of the slim portable electronic equipment.

That is, in order to decrease the thickness of the optical disc drive (ODD) employed to the slim portable electronic equipment, the thickness of the spindle motor included the optical disc drive (ODD) should be decreased.

Figure 1:
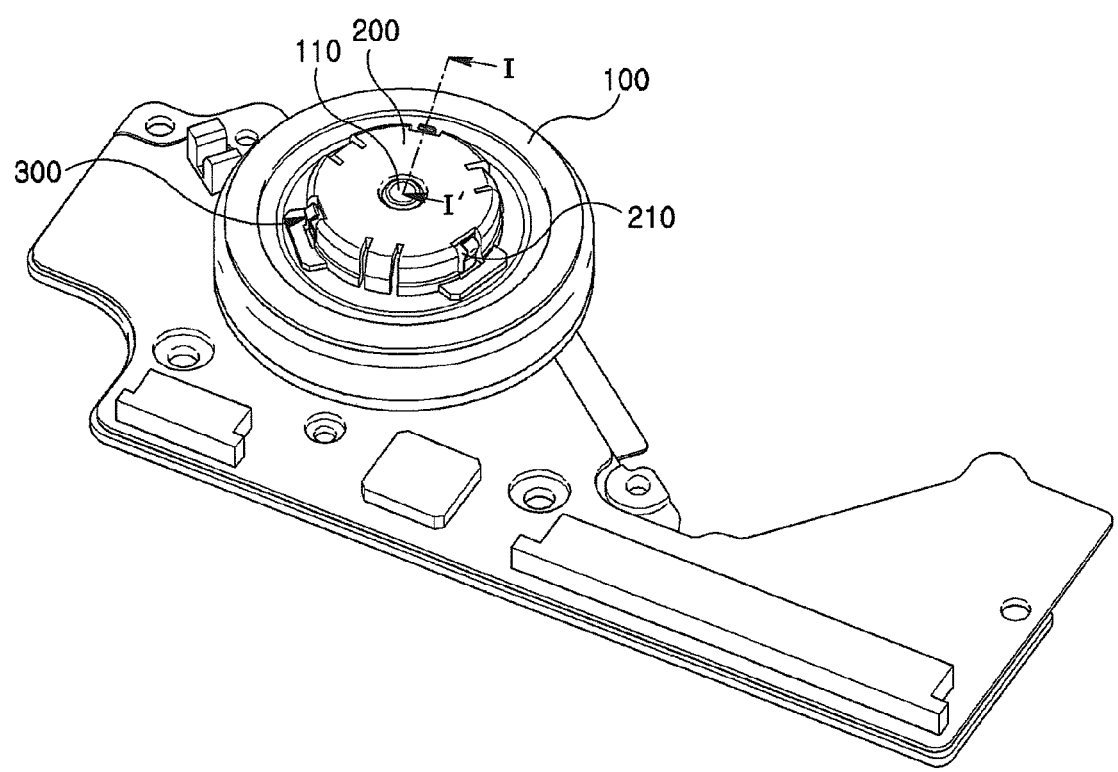
FIG. 1 is a perspective view illustrating a spindle motor in accordance with the present invention.
Figure 2:
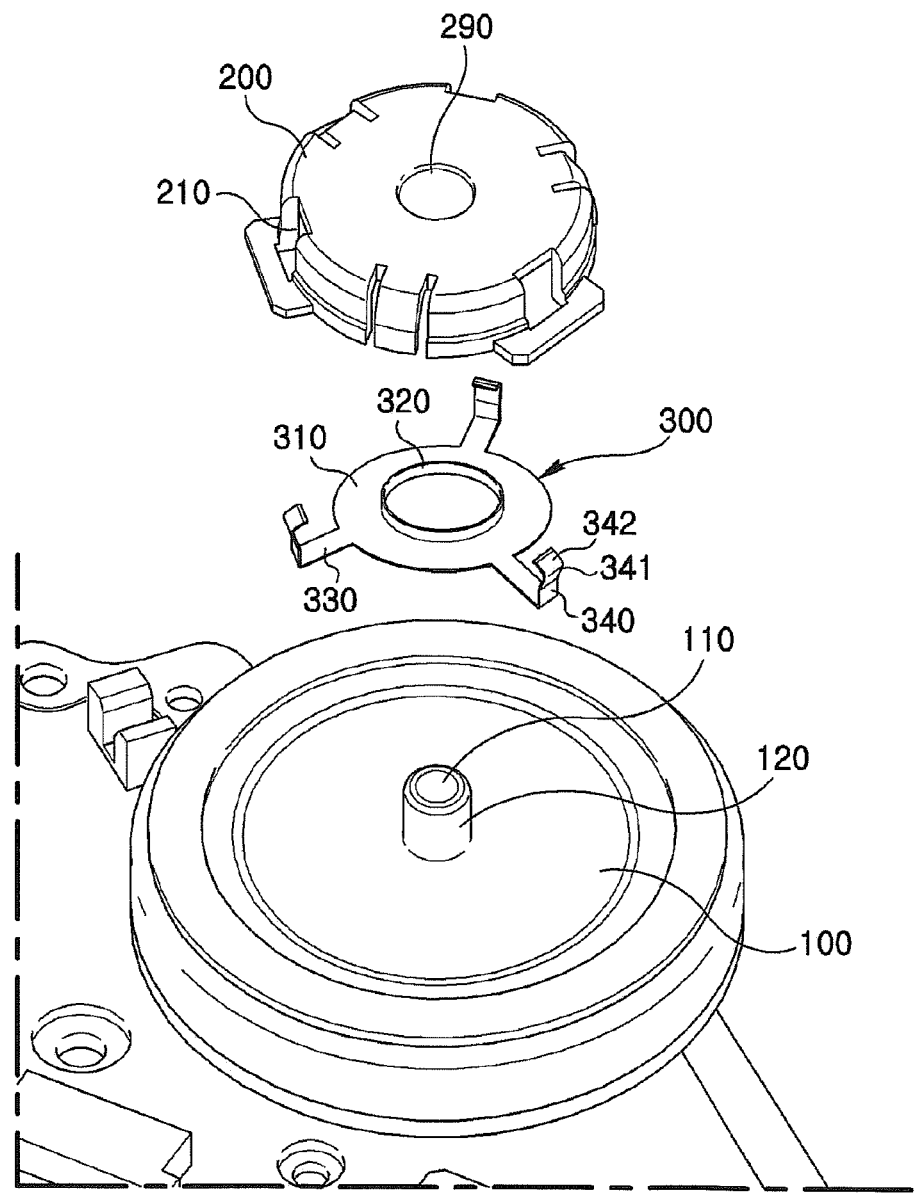
FIG. 2 is an exploded perspective view illustrating the spindle motor in accordance with the present invention.
Figure 3:
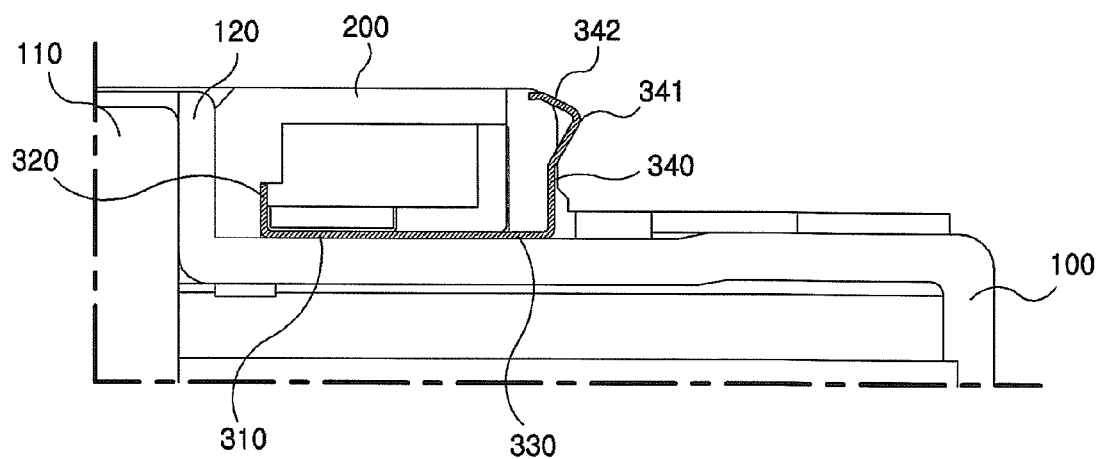
FIG. 3 is a cross-sectional view taken along a line I-I' in FIG. 1.

The spindle motor applied to the slim optical disc drive is illustrated in FIGS. 1 to 3.

The spindle motor is a kind of a BLDC (Brushless DC) motor driven by commutating using the semiconductor device, the spindle motor rotates the optical disc at a constant and high speed.

The spindle motor includes a base plate having the printed circuit board (PCB), a stator coupled to the base plate, a rotating shaft rotatably coupled to stator, and a rotor yoke coupled to the rotation shaft.

The rotor yoke has at least one chucking arm disposed on the rotor yoke. The chucking arm aligns a center of the optical disc to the center of the rotating shaft. Alternatively, in a case a turn table for mounting the optical disc is additionally coupled to the rotating shaft together with the rotor yoke, the chucking arm may be formed on the turn table instead of the rotor yoke.

In a case the optical disc is rotated by the spindle motor at a high speed, because the chucking arm chucks the optical disc, the optical disc is fixed on the rotor yoke.

Hereinafter, embodiments of the present invention are described herein with reference to illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an etched region illustrated as a rectangle will, typically, have rounded or curved features. Thus, the regions illustrated in the figures are schematic in nature and their shapes are not intended to illustrate the precise shape of a region of a device and are not intended to limit the scope of the present invention. Various embodiments of the present invention will now be described with reference to the accompanying drawings.

FIG. 1 is a perspective view illustrating a spindle motor in accordance with the present invention. FIG. 2 is an exploded perspective view illustrating the spindle motor in accordance with the present invention. FIG. 3 is a cross-sectional view taken along a line I-I' in FIG. 1.

Referring to FIGS. 1 to 3, a spindle motor 400 may include a rotation shaft 110, a rotor yoke 100, a clamp case 200, and a chucking member 300. The spindle motor 400 of the embodiment of the present invention may further include bearing housing having a top-opened hollow-can shape, a bearing press-fitted into the bearing housing, core that is coupled to a circumferential face of the bearing housing and the coil wounded on the core. Additionally, the spindle motor 400 further includes a turn-table for mounting the optical disc, in a case the spindle motor 400 includes the turn-table, the clamp case 200 and the chucking member 300 may be disposed on the turn-table.

The rotation shaft 110 is rotatably coupled to the bearing.

The rotor yoke 100 is coupled to a circumferential face of the rotating shaft 110. The rotor yoke 100 has a bottom-opened hollow-can shape and the rotor yoke 100 has a coupled portion 120 extruded from an upper face of the rotor yoke 100.

The coupled portion 120 has a pipe shape for coupling the rotating shaft 110 and the rotating shaft 110 is press-fitted into an inner face of the coupled portion 120 of the rotor yoke 100 so that the rotor yoke 100 is rotated together with the rotating shaft 110.

In this embodiment of the present invention, the optical disc is directly mounted on the rotor yoke 100.

The clamp case 200, for example, has a bottom-opened hollow-can shape and an opening 190 is formed at a center portion of an upper face of the clamp case 200.

The coupled portion 120 of the rotor yoke 100 combined with the circumferential face of the rotating shaft 110 is inserted into the opening 290 of the clamp case 200 so that the clamp case 200 is coupled to the rotor yoke 100.

A center portion of the optical disc is aligned with a center of the rotating shaft 110 by using the clamp case 200. The clamp case 200 then functions as a base of the chucking member 300 (described below) for chucking the inner face of the optical disc.

The clamp case 200 is combined with a circumferential face of the coupled portion 120 that is extruded from the center of the upper face of the rotor yoke 100. Alternatively, in a case the spindle motor 400, for example, includes a turn table for mounting the optical disc instead of the rotor yoke 100, the clamp case 200 may be directly disposed on the turn table or coupled to the rotating shaft 110.

A side face of the clamp case 200 has at least one through-hole 210 and the through-hole 210 is positioned at a position that corresponds to that of the chucking member 300 for chucking the inner face of the optical disc. In the present invention, three through-holes 210 are formed at the side face of the clamp case 200 and three through-holes 210 are formed at a same interval.

A conventional chucking member for chucking the optical disc includes a chucking arm coupled to an inner face of the optical disc and a spring providing an elastic force to the chucking arm, whereas the chucking member 300 chucks or elastically supporting the inner face of the optical disc. Thus, assembling or manufacturing characteristics of the spindle motor of assembling are improved and a manufacture cost of the spindle motor is decreased.

The chuck member 300 is formed by bending a metal plate or a synthetic plate.

The chuck member 300 includes a rim portion 310, an extension portion 330, a chucking arm portion 340, and a hook portion 320.

The rim portion 310, for example, may be formed at a doughnut shape having an inner face and an outer face. The circumferential face of the rotation shaft 110 is passing through an opening formed by the inner face of the rim portion 310 and the rim portion 310 then interposed between the clamp case 200 and the rotor yoke 100.

In this embodiment of the present invention, a plurality of extension portions 330 is extended from an edge of the outer face of the rim portion 310. Each of the extension portions 330 is, for example, rectangular plate shape when viewed from a plane. As seen in FIG. 3, each of the extension portions 330 is disposed on and in physical contact with the rotor yoke 100.

The embodiment of the present invention, the extension portions 330 are positioned at a position corresponding to the through-holes 210 formed at the clamp case 200.

That is, a position of each of the extension portions 330 corresponds to a position of the through-holes 210 formed at the side face of the clamp case 200. Since three through-holes 210 is formed at the side face of the clamp case 200, three extension portions then are extended from the edge of the outer face of the rim portion 310.

The chucking arm portions 340 are formed at an end portion of the extension portions 330, the chucking arm portions 340 are formed by bending the end portion of the extension portion 330.

The chucking arm portions 340 formed at each of the extension portion 330 are then positioned at a position corresponding to each of the through-holes 210 formed at the clamp case 200.

In a case the chucking arm portions 340 are coupled to the inner face of the optical disc, the chucking arm portion 340 are elastically strained by the inner face of the optical disc, thereby coupling the chucking arm portion 340 to the inner face of the optical disc.

The chucking arm portion 340 for chucking the inner face of the optical disc is bended by an acute angle.

The chucking arm portion 340 includes a first inclined portion 341 and a second inclined portion 342. The second inclined portion 342 is formed at an end portion of the first inclined portion 341.

The first inclined portion 341 is bent from the chucking arm portion 340 in a clockwise direction, thereby forming an obtuse angle between the first inclined portion 341 and the inner face of the optical disc. The second inclined portion 342 is bent from an end portion of the first inclined portion 341 in a counter-clockwise direction, thereby forming an acute angle between the first and second inclined portions 341 and 342.

In a case the inner face of the optical disc is inserted into the clamp case 200, the second inclined portion 342 is elastically strained by the inner face of the optical disc and the inner face of the optical disc is then coupled to the first inclined portion 341. Thus, the center portion of the optical disc is aligned with the center portion of the rotating shaft 110 based on an elastic force of the first inclined portion 341.

The hook portion 320 is protruded from the inner face of the rim portion 310 and the hook portion 320 has a circular rim shape. The rim portion 310 is coupled to the clamp case 200 using the hook portion 320.

However, in the case that an optical disc drive is installed in a desk-top computer, the optical disc drive includes a spindle motor and a clamper for clamping an optical disc on a turn table of the spindle motor. The clamper is disposed above the turn table of the spindle motor. Alternatively, a member for clamping the optical disc may be integrally formed at the spindle motor instead of the clamper for clamping the optical disc.

Hereinafter, one embodiment of a spindle motor installed on the desk-top computer is described in FIG. 4

Figure 4:
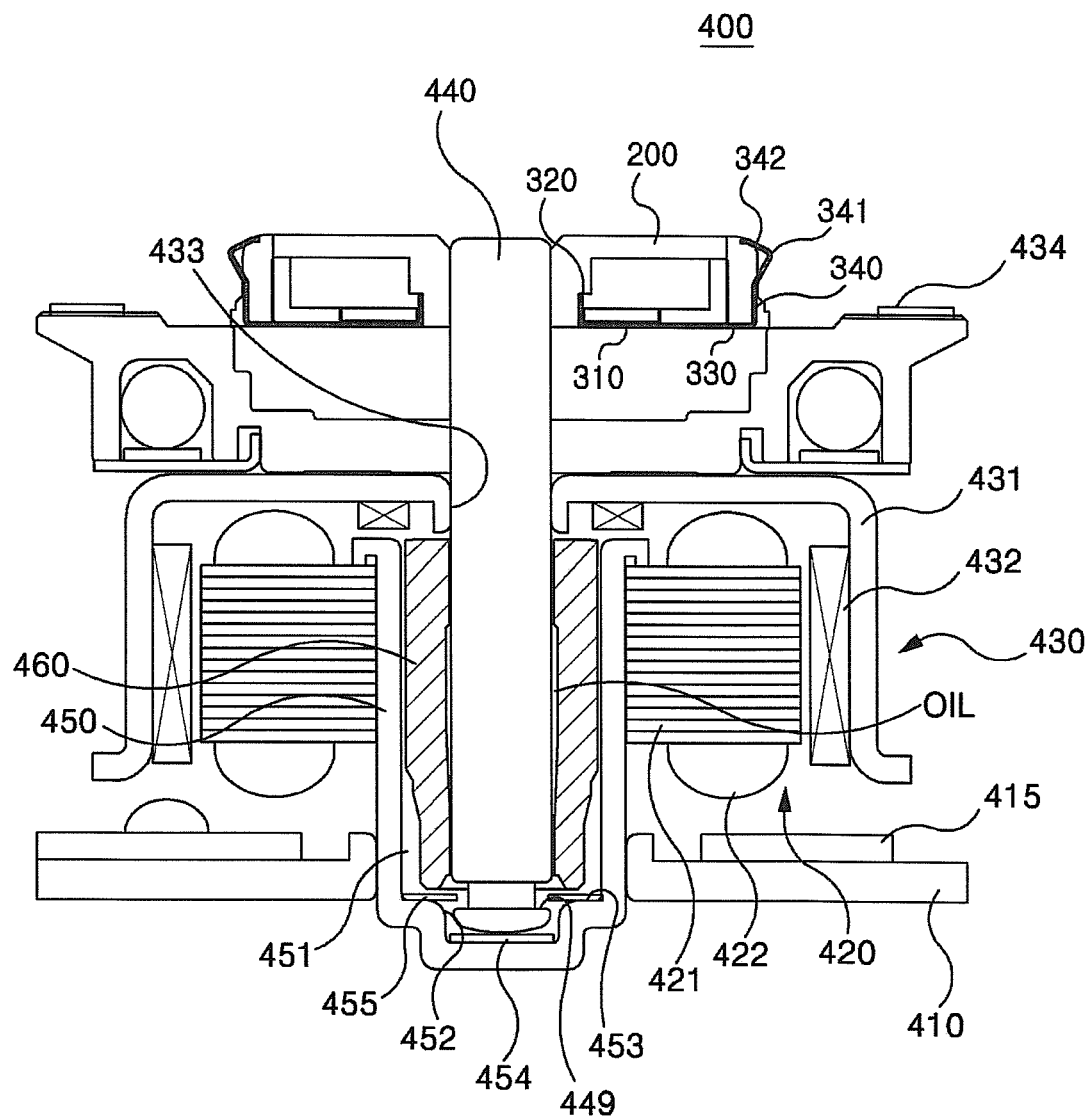
FIG. 4 is a cross-sectional view illustrating a spindle motor according to another embodiment of the present invention.

FIG. 4 is a cross-sectional view illustrating a spindle motor according to another embodiment of the present invention.

Referring to FIG. 4, the spindle motor 400 installed on the optical disc driver for the desk-top computer includes a base plate 410, a stator 420, a rotor 430 having a clamp case 200 and the chucking member 300, a rotating shaft 440, and a bearing assembly 470.

The base plate 410 includes a circuit substrate 415 and the circuit substrate 415 is disposed on an upper face of the base plate 410.

The bearing assembly 470 includes a bearing housing 450, a bearing 460, a thrust plate 454, and a stopper 455.

The bearing housing 450 has a top-opened hollow-can shape. A circumferential face of the bearing housing 450 is coupled to the base plate 410 by using a through-hole formed through the base plate 410.

The bearing housing 450 has a bearing receiving portion 451, a thrust plate receiving portion 452, and a stopper support portion 453 formed by the bearing receiving portion 451 and the trust plate receiving portion 452.

The bearing 460, which has a pipe shape, is press-fitted into the bearing receiving portion 451 of the bearing housing 450. The rotating shaft 440 is inserted into a hollow hole formed at the bearing 460 and the rotating shaft 440 is rotatably coupled to the bearing 460. The bearing 460 may be sintering oil-impregnated bearing. A gap for rotating shaft 440 is formed between the circumferential face of the rotating shaft 440 and an inner face of the bearing 460.

The trust plate 454 is disposed on the thrust plate receiving portion 452. The thrust plate 454 decrease a friction generated between the rotating shaft 440 and the bearing housing 450 that contacts to the end portion of the rotating shaft 440. The thrust plate 454 supports a load of the rotating shaft. The thrust plate 454 is disposed between a lower end portion of the rotating shaft 440 and a bottom face of the bearing housing 450.

The stopper 455 having a washer shape is disposed between the stopper support portion 453 and an end portion of the bearing 460.

The stopper 455 is coupled to a groove 449 formed at the circumferential face of the rotating shaft 440. In a case the rotating shaft 440 rotates at a high speed, the stopper 455 prevents the rotating shaft 440 from being lifting from the thrust plate 454

The stator 420 is combined with the circumferential face of the bearing housing 450.

The stator 420 includes a core 421 disposed around the bearing housing 450, and a coil 422 wounded around the core 421. In this embodiment of the present invention, the core 421 is coupled to a circumferential face of the bearing housing 450.

The rotor 430 is coupled to the rotating shaft 440 inserted into the hollow hole of the bearing 460.

The rotor 430 includes a rotor yoke 431 combined with the circumferential face of the rotating shaft 440 and a magnetic 432 disposed in the rotor yoke 431. Additionally, the rotor 430 further includes a turn table 434.

The rotor yoke 431 may include an upper plate and a side plate extending from an edge of the upper plate. The side plate of the yoke 431 opposites to the core 421 of the stator 420.

A coupled portion 433 is formed at a center portion of the upper plate of the rotor yoke 431 and the coupled portion 433 is combined with the circumferential face of the rotating shaft 440 so that the rotor yoke 431 rotates together with the rotating shaft 440.

The turn table 434 is disposed on the upper face of the rotor yoke 431 and the turn table 434 supports the optical disc.

In this embodiment of the present invention, in a case a driving signal such as a electrical current is applied to the coil 422 of the stator 420, the rotor 430 is rotated together with the rotating shaft 440 by using a rotation force generated between a magnetic field generated from the coil 422 and a magnetic field generated from the magnet 432.

The clamp case 200 included the rotor 430 has bottom-opened hollow-can shape and a through-hole 210 is formed at a side face of the clamp case 200. The through-hole 210 is formed at a portion corresponding to a chucking member 300 (described below) that is opposite to the inner face of the optical disc.

The clamp case 200, which is coupled to an inner face of the optical disc, aligns a center of the optical disc with a center of the rotating shaft 440. The clamp case 200 then functions as a base of the chucking member 300 for chucking the inner face of the optical disc.

The clamp case 200 is combined with a circumferential face of the rotating shaft 440. Alternatively, the clamp case 200 may be coupled to the turn table 434 instead of the rotating shaft 440.

The side face of the clamp case 200 has at least one through-hole 210 and the through-hole 210 is positioned at a position that corresponds to that of the chucking member 300 for chucking the inner face of the optical disc.

The chucking member 300 chucks the inner face of the optical disc using an elastic force.

The chuck member 300 is formed by bending a metal plate or a synthetic resin plate.

The chuck member 300 includes a rim portion 310, a plurality of extension portion 330, a chucking arm portion 340 and a hook portion 320.

The rim portion 310, for example, may have a doughnut shape having an inner face and an outer face. The circumferential face of the rotation shaft 440 is passing through the inner face of the rim portion 310 and the rim portion 310 then disposed between the clamp case 200 and the rotor yoke 430.

A plurality of extension portions 330 are extended from an edge of the outer face of the rim portion 310. Each of the extension portions 330 is, for example, rectangular plate shape when viewed from a plane. In a case at least three extension portions 330 are extended from the rim portion 310, the chucking arm portions 330 contacts at three points of the inner face of the optical disc.

The embodiment of the present invention, the extension portions 330 are positioned at a position corresponding to the through-hole formed at the clamp case 200.

That is, a position of each of the extension portions 330 corresponds to a position of the through-holes 210 formed at the side face of the clamp case 200. Since three through-holes 210 is formed at the side face of the clamp case 200, three extension portions then are extended from the edge of the outer face of the rim portion 310.

The chucking arm portions 340 are formed at each of an end portion of the extension portions 330, the chucking arms 340 are formed by bending an end portion of the extension portion 330.

The chucking arm 340 formed at the extension portion 330 is then positioned at a position corresponding to the through-hole 210 formed at the clamp case 200.

In a case the chucking arm 340 is coupled to the inner face of the optical disc, the chucking arm 340 is elastically strained by the inner face of the optical disc to couple the inner face of the optical disc.

A portion of the chucking arm 340 for chucking the inner face of the optical disc is bended by an acute angle.

The chucking arm 340 includes a first inclined portion 341 and a second inclined portion 342. The second inclined portion 342 is formed at an end portion of the first inclined portion 341.

The first inclined portion 341 is bent from the chucking arm 340 in a clockwise, thereby forming an obtuse angle between the first inclined portion 341 and the chucking arm 340.

The second inclined portion 342 is bent from an end portion of the first inclined portion 341 in a count clockwise, thereby forming an acute angle between the first and second inclined portions 341 and 342.

In a case the optical disc is inserted into the clamp case 200, the second inclined portion 342 is elastically strained by the inner face of the second inclined portion 342 and the optical disc is coupled to the clamp case 200, the inner face of the optical disc is combined with the first inclined portion 341. Thus, the center portion of the optical disc is aligned with the center portion of the rotating shaft 110 based on an elastic force of the first inclined portion 341.

The hook portion 320 is protruded from the inner edge of the ring portion 310 and the hook portion 320 has a circular rim shape. The ring portion 310 is coupled to the clamp case 200 using the hook portion 320.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor, comprising:
a rotating shaft coupling to a rotor yoke for supporting an optical disc;
a clamp case disposed on the rotor yoke and coupling to the rotating shaft; and
a chucking member including a rim portion combined with the clamp case, a plurality of extension portions radically extruded from an edge portion of the rim portion, and chucking arm portions formed at each of the end portions of the extension portions to chuck an inner face of the optical disc;
wherein each extension portion of the plurality of extension portions is disposed on and in contact with an upper face of the rotor yoke.

2. The spindle motor of claim 1, wherein the chucking member is formed with a metal or a synthetic resin.

3. The spindle motor of claim 1, wherein the chucking member is bent from an end portion of the extension portion to elastically chuck the inner face of the optical disc.

4. The spindle motor of claim 1, wherein the chucking arm portion is outwardly bent and the chucking arm portion has a convex shape.

5. The spindle motor of claim 4, wherein the chucking arm portion includes a first inclined portion outwardly bent from the chucking arm portion and a second inclined portion inwardly bent from an end portion of the first inclined portion.

6. The spindle motor of claim 5, wherein an angle formed between the first and second inclined portions has an acute angle.

7. The spindle motor of claim 1, wherein the rim portion of the chucking member has a doughnut shape and the rim portion is fixed by a bottom portion of the clamp case.

8. The spindle motor of claim 7, wherein the chucking member has a hook portion extruded from an inner face of the rim portion to couple to the clamp case.

9. The spindle motor of claim 1, wherein at least three extension portions are protruded from the edge of the rim portion.

10. The spindle motor of claim 1, wherein the clamp case includes a plurality of through-holes formed at a position corresponding to each of the chucking arm portions.

11. The spindle motor of claim 1, wherein the chucking arm portions of the chuck member is formed at a same interval.

12. A spindle motor, comprising:
a rotating shaft coupled to a rotor yoke for supporting an optical disc;
a clamp case disposed on the rotor yoke and coupling to the rotating shaft; and
a chucking member having a plurality of extension portions and a plurality of chucking arm portions for chucking the optical disc by using an elastic force and each of the chucking members being formed at a same interval;
wherein each of the chucking arm portions has a protruded plate shape protruded from a rim portion that is coupled to the clamp case and each of the chucking arm portions is coupled to an inner face of the optical disc using a through-hole of the clamp case, and
wherein each extension portion of the plurality of extension portions is disposed on and in contact with an upper face of the rotor yoke.

13. A spindle motor comprising:
a stator including a bearing housing fixed to a base plate, a bearing combined within the bearing housing, a core disposed around the bearing housing, and a coil wound around the core;
a rotating shaft rotatably coupled to the bearing;
a rotor including a yoke coupled to the rotating shaft and a magnet, which is disposed in the yoke, opposite to the core;
a turn table for mounting an optical disc coupled to the rotating shaft;

a clamp case disposed on the turn table and coupled to the rotating shaft; and a chucking member including a rim portion combined with the clamp case, a plurality of extension portions radially extruded from an edge portion of the rim portion, and chucking arm portion formed at each of the end portions of the extension portions to chuck an inner face of the optical disc;

wherein each extension portion of the plural extension portions is disposed on and in contact with an upper face of the rotor yoke.

14. The spindle motor of claim 13, wherein the chucking arm portion of the chucking member is bent from an end portion of the extension portion to elastically chuck the inner face of the optical disc.

15. The spindle motor of claim 13, wherein the chucking arm portion includes a first inclined portion outwardly bent from the chucking arm portion and a second inclined portion inwardly bent from an end portion of the first inclined portion and the first and second inclined portions are formed at an acute angle.

16. The spindle motor of claim 13, wherein the rim portion of the chucking member has a doughnut shape and the rim portion is fixed by a bottom portion of the clamp case.

17. The spindle motor of claim 16, wherein the chucking member has a hook portion extruded from an inner face of the rim portion to couple to the clamp case.

18. The spindle motor of claim 13, wherein at least three extension portions are protruded from the edge of the rim portion.

19. The spindle motor of claim 13, wherein the clamp case includes a plurality of through-holes formed at a position corresponding to each of the chucking arm portions.

* * * * *